Sept. 16, 1941.  R. LAPSLEY  2,256,320
TRANSMISSION
Filed Feb. 19, 1940  2 Sheets-Sheet 2
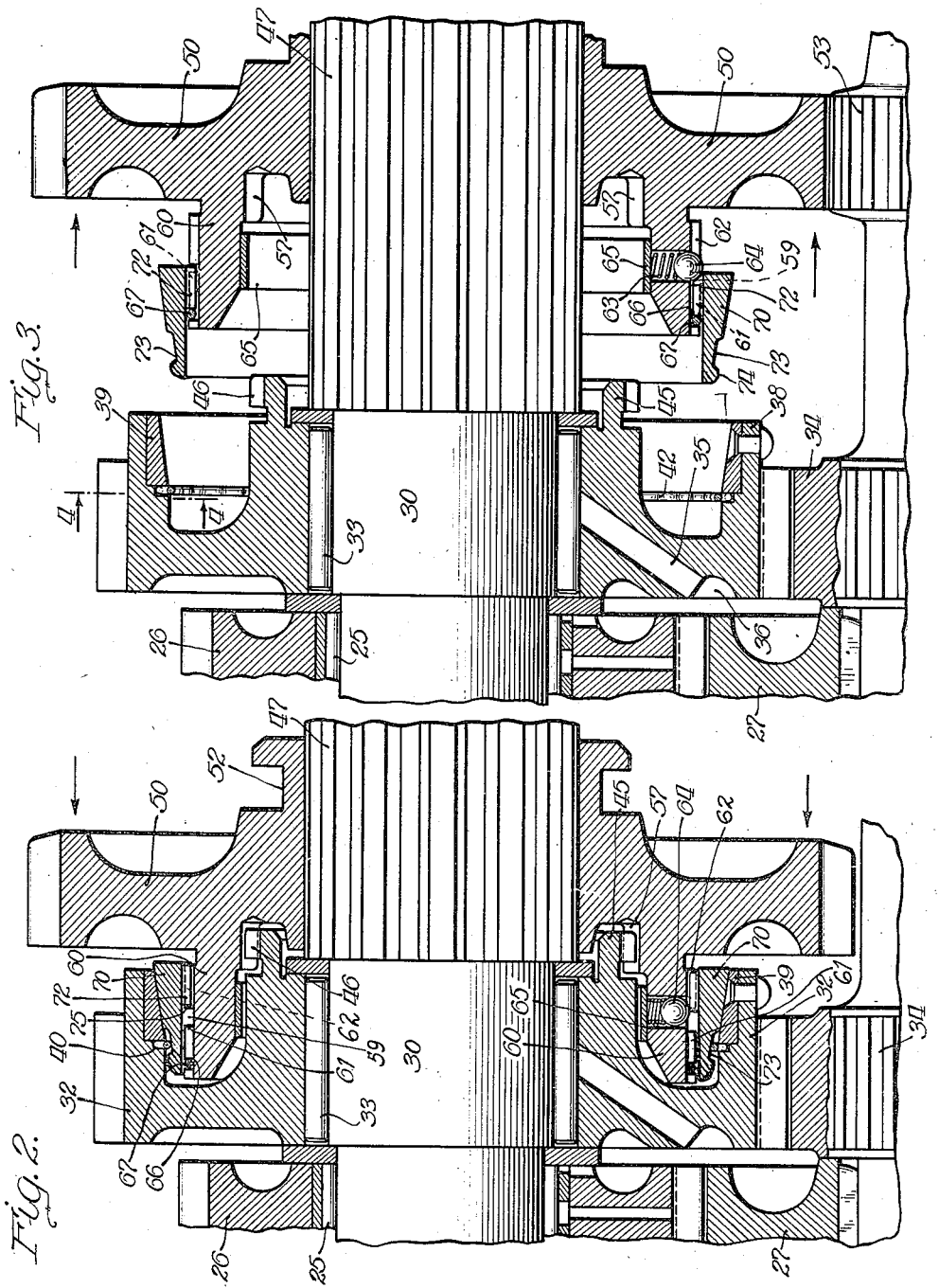
INVENTOR.
Robert Lapsley
BY Walter E. Schirmer
ATTORNEY.

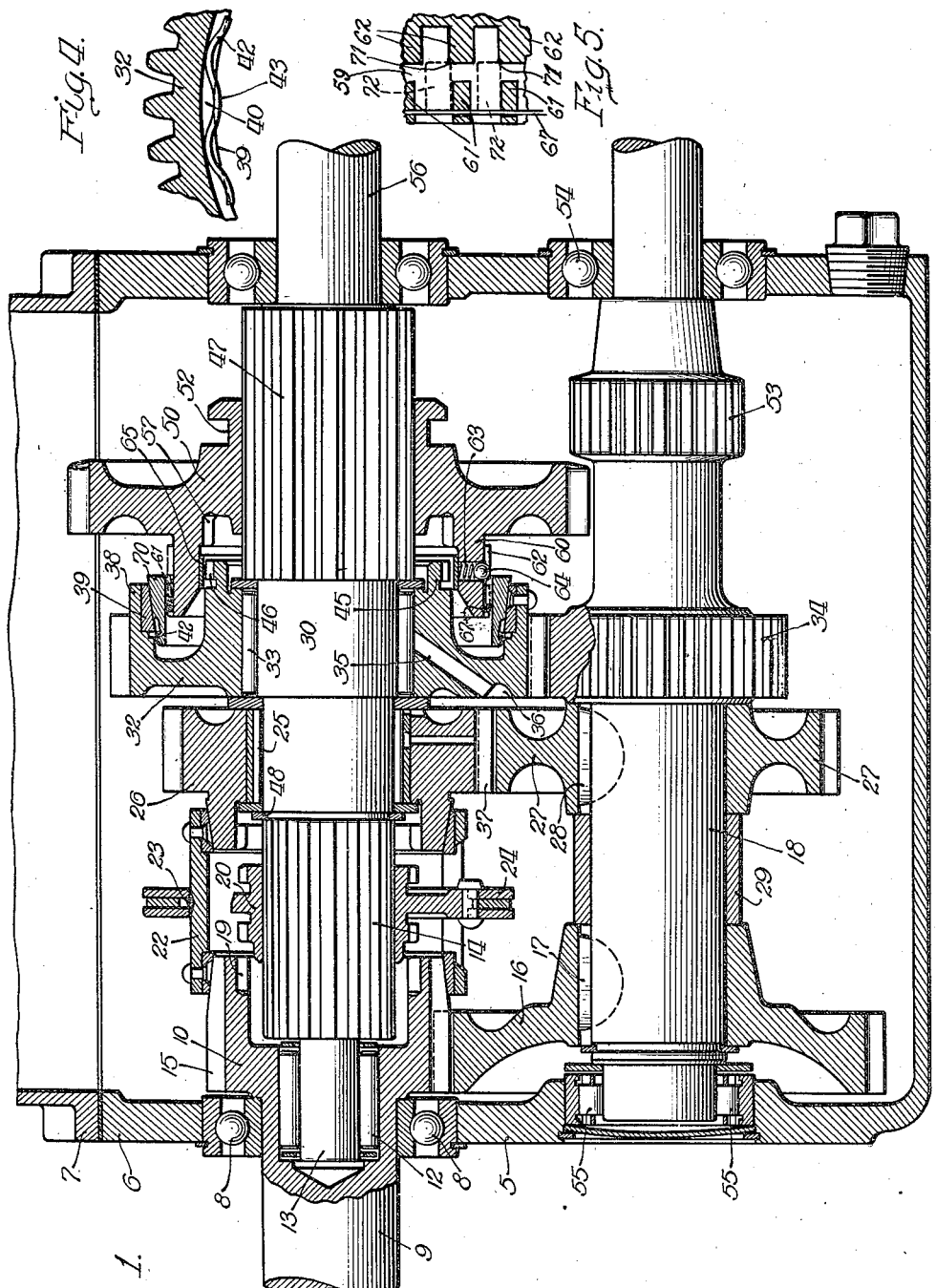

Patented Sept. 16, 1941

2,256,320

UNITED STATES PATENT OFFICE 2,256,320

TRANSMISSION

Robert Lapsley, Berrien Springs, Mich., assignor to Clark Equipment Company, Buchanan, Mich., a corporation of Michigan Application February 19, 1940, Serial No. 319,661

14 Claims. (Cl. 192—53)

This invention relates to transmissions, and more particularly is directed to a transmission of the synchromesh type for facilitating the selective speed changes therein.

It is one of the primary objects of the present invention to provide a four-speed transmission in which synchromesh gear shifting is available in all but the low speed and reverse.

Another object of the present invention is to provide a low speed gear on the transmission main shaft having an extended hub portion and internal clutch teeth adapted to carry synchronizing means whereby this gear can also be used for clutching the second speed gear to the transmission main shaft after the two gears have been brought into synchronism.

A further object of the present invention is to provide a construction wherein suitable detent means is provided for insuring synchronizing of the two gears prior to clutching of the same together with suitable means for insuring release of the detent means prior to release of the synchronizer sleeve from its mating friction surface. In connection with this last feature, the invention includes means for maintaining the synchronizer sleeve in engagement with the friction surface upon initial movement of the first speed gear out of clutching engagement to insure proper positioning of the synchronizer sleeve relative to this gear before it is released.

A still further object of the present invention is the provision of means for blocking the engagement of the two gears until synchronism therebetween is effected, this being accomplished by the spline formation on the first speed gear.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 1 is a sectional view through a transmission embodying the invention;

Figure 2 is an enlarged detail view of the synchronizing means when in clutch-engaged position;

Figure 3 is a corresponding view of the synchronizing means in inoperative position;

Figure 4 is a sectional view taken substantially on line 4—4 of Figure 3; and

Figure 5 is a diagrammatic view showing the blocking action produced in the present synchronizing mechanism.

Referring now in detail to the drawings, the transmission case or housing is indicated generally at 5 and has mounted on the upper flanged edge 6 thereof the cap or pedestal housing 7 in which are mounted the shift rails and selective control mechanism (not shown). Extending into the forward end of the housing 5 and journalled in the bearings 8 is a clutch shaft or power shaft 9 having the enlarged end 10 which is axially recessed to receive the roller bearings 12 piloting the stud end 13 of the main transmission shaft 14 therein. The external portion of the end 10 of the shaft is provided with the gear teeth 15 which are in constant meshing engagement with the teeth of a gear 16 keyed as indicated at 17 to a countershaft 18. Adjacent the end of the shaft 9, there is provided internal clutch teeth 19 adapted to be engaged by the clutch sleeve 20 splined onto the shaft 14 for directly clutching the shafts 9 and 14 in direct driving connection. A suitable synchronizer sleeve 22 is provided for engagement with the bevelled surface of the gear teeth 15 and resiliently engaged by the wire springs 23 carried by the shifting yoke 24. The details of this synchronizer construction are described in detail in the copending application of Leo A. Bixby and myself, Serial No. 298,391, filed October 7, 1939.

Mounted upon suitable bearings 25 carried by the shaft 14 is a gear 26 also having internal clutch teeth adapted to be engaged by the sleeve 20 whereby the gear 26 can be clutched for conjoint rotation with the shaft 14. The gear 26 is in constant meshing engagement with a gear 27 keyed as at 28 to the countershaft 18. A suitable spacing sleeve 29 is provided between gears 16 and 27. This construction, with the exception of the details of the synchronizing mechanism 22, is more or less conventional, and it is not believed that it needs any further description.

The shaft 14 is provided with an enlarged portion 30 upon which is rotatably mounted the gear 32 by means of the bearings 33. This gear 32 is in constant meshing engagement with the gear 34 formed integral with the countershaft 18, and is driven thereby at all times that the countershaft 18 is rotating, it being apparent that the countershaft is driven at all times by means of its direct driving connection with the power shaft 9.

The gear 32 is provided with spaced passageways 35 which extend angularly in both a radial and axial direction and open in the enlarged cup portions 36 formed in the face of the gear 32 at a position in alinement with the point of meshing engagement of the gears 26 and 27, as indicated at 36. The passageways 35 are adapted to receive lubricant driven off from the point of meshing engagement of the gears 26 and 27, which lubricant is forced through the passageways 35 to the bearings 33 against the centrifugal force developed by rotation of the gear 32. The particular details of construction of the gear 32 and its passageways 35 relative to this lubricating arrangement are described in detail in the copending application of Carl L. Bixby, Serial No. 333,507, filed May 6, 1940 to which reference should be made.

The gear 32 adjacent its periphery is provided with an axially extended portion 38 which is suitably recessed to receive the conical friction member 39 pressed therein and defining with the counterbored portion 40, shown in Figures 2 and 4, an annular recess adapted to receive the sinuous wire spring 42 which has portions thereof disposed entirely within the recess and other portions thereof, as indicated at 43, projecting radially inwardly of the recess.

The gear 32 is also provided with an axially extended hub portion 45 carrying external clutch teeth 46. The gear is held against axial movement on the shaft portion 30 by abutment against the shoulder between the portion 30 and the splined portion 47, and at its opposite end by engagement against the hub of gear 26 which in turn is locked through any suitable locking means, such as indicated at 48 on the shaft 14.

Carried on the splined portion 47 of the shaft 14 and axially slidable thereon is a gear 50 having the shifting collar portion 52 formed therein adapted to be engaged by a suitable shift fork for effecting axial movement of the gear 50. When the gear 50 is moved into the position shown in Figure 3, it is adapted to have meshing engagement with a countershaft gear 53 formed integral with the countershaft 18 adjacent the rear end thereof. The countershaft is journalled in suitable bearings 54 at its rear end and in a roller bearing assembly 55 at its forward end, this arrangement being similar to that described in my Patent No. 1,992,898, issued February 26, 1935.

When the gear 50 is in engagement with the gear 53 and the clutch 20 is in neutral position, low speed drive through the transmission is effected, the shaft 14 having the outwardly extending rear end 56 by means of which connection can be made to any suitable driving means. Second speed drive is effected by clutching the gear 32 to the shaft 14 whereby this gear is driven from the gear 34 on the countershaft, and in turn, drives the shaft 14 through this particular ratio. Third speed gear is effected by shifting the clutch 20 into engagement with the clutch teeth on the gear 26, thereby clutching this gear to the shaft 14 for drive from the countershaft gear 27, and fourth or direct drive is effected by shifting the clutch 20 into engagement with the clutch teeth 19 to couple the shafts 9 and 14 directly.

The present invention particularly relates to the synchronizing means provided between the gears 32 and 50 so that when the gear 32 is clutched to the shaft 14 through the gear 50 it will first be brought into substantially synchronous rotation with the gear 50 prior to engagement of the clutch teeth 57 with the clutch teeth 46 of this gear. For this purpose, the gear 50 is provided with the axially extending annular flange portion 60 provided on its external surface with axially alined narrow and wide splines 61 and 62 spaced apart by an annular cut away portion 59. At suitable circumferentially spaced points intermediate the splines 61 and 62 the flange 60 is provided with radial passageways within which are disposed the springs 63 and the ball detents 64. The springs are retained in position within the recesses by the sleeve 65 pressed into the inner boss of the flange 60 whereby they normally urge the ball detents outwardly of the openings. The detents are restrained against outward movement by the rear ends of splines on the synchronizer sleeve 70 limiting the outward movement of the balls 64, the splines being cut away at these points to a form generally conforming to the surface of the balls for this purpose, while the remaining sleeve splines have conventional end surfaces.

Adjacent the forward end of the splines 61 there is provided an annular groove or relief 66, shown more in detail in Figures 2 and 3 within which is disposed the ring 67 for a purpose to be hereinafter described. Mounted on the splines 62 is a synchronizer sleeve 70 which has the internal splines 72 normally mating with the splines 61 and having clearance therewith providing limited circumferential movement of the sleeve with respect to the gear 50 during initial shifting movement.

The sleeve 70 is provided with a tapered external surface adapted to have friction engagement with the tapered surface of the friction ring 39 and provided adjacent the smaller end thereof with an annular groove or recess 73. This recess is terminated by the rounded shoulder portion 74.

As the gear 50 is moved toward the gear 32, the tapered shoulder portion 74 of the sleeve 70 engages the inwardly extending portions 43 of the spring 42 carried by the gear 32, and radially spreads these portions to move therepast, the spring portion 43 then springing into the recess 73. As the sleeve 70 comes into frictional engagement with the ring 39, the pressure of balls 64 on the rear ends of splines 72 produces relative rotation of the sleeve 70 with respect to extension 60, causing the rear ends of the intermediate splines 72 to engage the corners of the wider splines 62. This blocks relative axial movement between sleeve 70 and extension 60, and the pressure of the balls 64 maintains the sleeve rotated into blocking position, as seen in Figure 5. If desired, the corners 71 may be beveled or chamfered for this purpose. As long as the gears 32 and 50 are out of synchronism, the pressure of the springs 63 and the corner engagement at 71 is sufficient to hold the sleeve in its rotated position. This blocks further inward movement of gear 50 until the two gears are in synchronism, when the blocking action is released and splines 72 are free to move between splines 62. This allows the clutch teeth 57 to engage with clutch teeth 46 to positively lock the two gears for conjoint rotation, without any danger of clashing of these clutch teeth.

The mechanism is then in the position shown in Figure 2 with the splines 72 of the sleeve 70 moved rearwardly over the balls 64 and into engagement between the wider splines 62, retaining these balls in depressed position within the radial passageways in the extension 60. When it is desired to declutch the gear 32 from the shaft, the gear 50 is moved to the right, and when it reaches a position such as shown in Figure 1, the rear ends of the spline 72 have been moved forwardly out of splines 62 so that the balls 64 can move out to the position shown in Figure 3. This relative movement between the gear 50 and the sleeve 70 is provided by the spring 42 holding the sleeve 70 against rearward movement as the gear 50 is initially moved out of engagement.

When the gear 50 has been moved into this position, as shown in Figure 1, the front ends 75 of the splines 72 engage the ring 67 preventing further relative axial movement between the sleeve 70 and the extension 60. Continued movement of the gear 50 in the clutch releasing direction causes the shoulder 74 to again spread the spring 42, releasing the sleeve 70 from engagement and allowing the entire assembly to move to the right, as shown in Figure 3, whereby the gear 50 moves into meshing engagement with the gear 53 to provide for low speed drive. The gear 50 is adapted to have a neutral position substantially as shown in Figure 1 in which the sleeve 70 is disposed closely adjacent the ring 39 but has not been pressed into full frictional engagement therewith.

It will be apparent that with this construction, the ball detents 64 insure the sleeve being pressed against the ring 39, and the pressure produced by the springs 63 is sufficient to hold the ball detents 64 against the rear end of the splines 72 until the shoulder 74 on the sleeve has forced the spring 42 into a position allowing the sleeve to pass thereby and into frictional engagement with the ring 39. When this frictional engagement has been effected, continued axial pressure on the gear 50 causes the splines 72 to rotate into blocking engagement with splines 62. Upon the gears reaching synchronism, this blocking action is released, thereby allowing the interengaging clutch teeth 46 and 57 to move into meshing engagement.

The ring 67 is provided for insuring withdrawal of the sleeve 70 from within the annular recess in the gear 32 when the gear 50 is moved into meshing engagement with the gear 53, this ring being such that it will hold the forward edges of the spline 72 against movement and cause the shoulder portion 74 of the sleeve to spread the ring 42 for allowing this withdrawal.

It will be noted that the recess 73 in the sleeve 70 is of an axial extent appreciably greater than the diameter of the ring 42, thereby allowing sufficient relative movement between the sleeve 70 and the ring 39 to insure proper frictional engagement therebetween. This lost motion is also desired to insure that the interengaging clutch teeth 46 and 57 will move out of engagement before the sleeve 70 is released from the engagement with spring 42, thereby insuring movement of the sleeve 70 forwardly to release the detents 64. Release of these detents is necessary to insure that the friction surfaces of the sleeve and ring engage prior to engagement of the clutch teeth, the detents being sufficient to hold the sleeve against inward movement of the splines 72 when the spring 42 is being spread apart to permit entrance therepast of the small end of the sleeve 70.

It will therefore be apparent that the present construction provides a blocking type mechanism for synchronizing the clutching engagement between the gears 32 and 50 to prevent clashing of the clutching gears during the shifting from first speed to second speed. The provision of a gear such as the driving gear 50, which is employed in low speed operation, with synchronizing means carried directly thereon for effecting the synchronous clutching from the second speed gear to the main transmission shaft is believed novel and provides a very economical and simple construction.

I am aware that various changes may be made in certain of the details of the present construction, and I therefore do not intend to be limited except as defined by the scope and spirit of the appended claims.

I claim:

1. In combination, a shaft having a splined portion, a gear rotatably journalled at one end of said portion, a second gear splined for axial shifting movement toward and away from said first gear, and synchronizing means between said gears comprising a frusto-conical sleeve carried by said second gear, a mating friction surface carried by said first gear, means on said first gear adjacent the inner end of said surface forming a resilient detent tending to prevent axial separation of said sleeve and surface, and means on said second gear for positively withdrawing said sleeve from said detent.

2. In a transmission, a main shaft, a gear freely rotatable thereon, an axially slidable splined low speed gear on the main shaft shiftable into clutching engagement with said rotatable gear, a synchronizer sleeve carried by said splined gear, friction means on said rotatable gear engaged by said sleeve, inter-engaging clutch teeth between said rotatable gear and said splined gear engageable only after said synchronizer sleeve has had predetermined pressure engagement with said friction means, and means on said rotatable gear engageable by a portion of said sleeve providing a resilient detent tending to hold said sleeve against axial movement away from said friction means upon initial shifting of said splined gear out of clutching engagement with said rotatable gear.

3. In combination, a splined shaft, a gear axially slidable thereon, a second gear rotatably journalled on said shaft, a hub extension on said first gear having internal clutch teeth, a hub extension on said second gear having mating external clutch teeth, said first gear extension having an externally splined portion, a synchronizer sleeve carried thereon, spring detent means between said sleeve and splined portion, a coacting friction surface on said second gear, means for shifting said first gear toward said second gear to bring said sleeve and friction surfaces together for bringing said gears into substantial synchronism prior to engagement of said clutch teeth and resilient means yieldably preventing separation of said sleeve from said friction surface during declutching of said first gear.

4. In combination, a shaft having a first gear splined thereon for axial movement and a second gear rotatably journalled thereon, synchronizing means carried by said splined gear and engageable with said rotatably journalled gear to bring the two gears to substantially the same speed of rotation, interengaging clutch means on said two gears engageable subsequent to engagement of said synchronizing means, and means providing for limited movement of said splined gear out of clutching engagement prior to release of said synchronizing means.

5. In combination, an axially shiftable gear having an externally splined axial extension, a synchronizer sleeve splined thereon and having an external friction surface, a second gear fixed against axial movement and having a mating friction surface, resilient means carried by said second gear normally engaging said sleeve but providing limited axial movement thereof, means on said extension operable to disengage said sleeve from said resilient means upon predetermined movement of said first gear axially away from said second gear, and resilient means carried by said extension normally moving said sleeve conjointly with said first gear upon axial shifting thereof toward said second gear but displaceable under predetermined pressure to allow continued axial movement of said first gear toward said second gear independently of said sleeve.

6. In combination, a shaft, a pair of transmission gears thereon, one of said gears being freely rotatable on said shaft but fixed in axial position and the other being splined on said shaft for axial shifting movement, interengageable clutch teeth carried by said gears radially within the gear tooth portions thereof, a synchronizer sleeve splined on said splined gear, detent means engaging said sleeve and operable under predetermined pressure to provide movement of said splined gear toward said first gear independently of movement of said sleeve and resilient detent means engaging between said sleeve and said first gear providing limiting movement of said second gear away from said first gear prior to movement of said sleeve.

7. A gear having an external gear tooth portion, an internally splined hub, an axially extending flange intermediate said hub and tooth portion and having external splines, an internal clutch tooth portion on said gear radially inwardly of said flange, a synchronizer sleeve non-rotatably carried on said splined flange and axially slidable thereon, and means in said splined flange preventing axial outward movement of said sleeve therefrom beyond a predetermined released position.

8. A gear having an external gear tooth portion, an internally splined hub and axially extending flange intermediate said hub and tooth portion and having external splines, an internal clutch tooth portion on said gear radially inwardly of said flange, a synchronizer sleeve non-rotatably carried on said splined flange and axially slidable thereon, detent means carried in the flange for restraining axial movement of said sleeve in one direction on said splines, and means carried in said flange preventing axial outwardly movement of said sleeve in the opposite direction on said splines beyond a predetermined released position of said detent means.

9. In a transmission, a main shaft, a gear rotatably journalled thereon, a second gear splined thereon for axial shifting movement, clutch teeth on each gear adapted for interengagement upon shifting of said second gear toward said first gear, a synchronizing sleeve carried by said second gear and having limited axial movement relative thereto, means positively preventing axial displacement of said sleeve from said second gear, detent means operable to allow relative axial movement of said sleeve with respect to said second gear upon predetermined axial pressure therebetween, and resilient detent means on said first gear engageable with said sleeve upon engagement therebetween during clutching movement of said second gear.

10. The transmission of claim 9 further characterized in that said last-named detent means limits movement of said sleeve away from said first gear during initial declutching movement of said second gear.

11. The transmission of claim 9 further characterized in that said last-named detent means comprises a spring ring engageable with said sleeve to limit movement of said sleeve away from said first gear during initial declutching movement of said second gear and until said sleeve is engaged by said displacement preventing means.

12. The combination, with a shaft having an axially fixed rotatable gear, and a splined axially shiftable gear provided with an externally splined axial extension, of synchronizing mechanism including a friction surface on said first gear, a synchronizer sleeve splined for axial movement on said extension, detent means operable upon movement of said sleeve into engagement with said surface limiting relative separating movement therebetween, and means on said extension engageable with said sleeve upon declutching movement of said shiftable gear for overcoming said detent means to withdraw said sleeve from said surface.

13. The combination, with a shaft having an axially fixed rotatable gear, and a splined axially shiftable gear provided with an externally splined axial extension, of synchronizing mechanism including a friction surface on said first gear, a synchronizer sleeve splined for axial movement on said extension, means carried by said extension limiting axial movement of said sleeve outwardly along said extension, and radial poppet means for releasably limiting movement of said sleeve in the opposite direction relative to said extension.

14. The combination, with a shaft having an axially fixed rotatable gear, and a splined axially shiftable gear provided with an externally splined axial extension, of synchronizing mechanism including a friction surface on said first gear, a synchronizer sleeve splined for axial movement on said extension, said sleeve having an annular external groove adjacent its forward end, resilient detent means carried by said first gear engageable in said groove for limiting separating movement of said sleeve away from said surface, and means on said extension engaging said sleeve upon predetermined shifting of said second gear away from said first gear to lock said sleeve for conjoint movement with said extension, whereby said sleeve is withdrawn from said detent means.

ROBERT LAPSLEY.